Oct. 13, 1942. C. H. NORDELL Re. 22,199

SCREEN

Original Filed April 11, 1932 2 Sheets-Sheet 1

Inventor:
Carl H. Nordell,
by Charles O. Sherry
his Atty.

Oct. 13, 1942. C. H. NORDELL Re. 22,199

SCREEN

Original Filed April 11, 1932 2 Sheets-Sheet 2

Inventor:
Carl H. Nordell,
by Charles O. Shirley
his Atty.

Reissued Oct. 13, 1942

Re. 22,199

UNITED STATES PATENT OFFICE 22,199

SCREEN

Carl H. Nordell, Coloma, Mich.

Original No. 1,948,125, dated February 20, 1934, Serial No. 604,511, April 11, 1932. Application for reissue July 5, 1941, Serial No. 401,300

14 Claims. (Cl. 210—152)

This invention relates to screens, and more particularly to screens of that character which are employed for screening out debris, trash and other solid and semi-solid matter from water or other liquids. Screens of this character are employed in sewage disposal plants for removing the debris, trash and other solid and semi-solid substances from the sewage before the sewage is further treated in the plant. In many establishments water from streams lakes and other pools is employed for various purposes, and the screen has been designed for use in situations of this kind.

The difficulty encountered with screens heretofore used is that of preventing the screens from becoming clogged, and various expedients have been resorted to with a view towards removing this objectionable feature. One of the objects of the present invention is to provide a screen having continuous openings therein, whereby the openings are constantly kept clear, thereby eliminating any possibility of clogging.

Another object is to provide a screen constructed of similar units which may be readily assembled to provide a screen for any desirable capacity and to provide a screen having openings of any desirable size.

Another object is to provide a screen which is strong, substantial and capable of withstanding the hard usage to which screens of this character are usually put.

To such ends this invention consists in a screen composed of a multiplicity of ring-like screen units secured together and suitably spaced apart to provide continuous openings therebetween, in combination with cleaning means entering the spaces between the ring-like units, one of said elements being rotatable relative to the other, whereby the spaces between the rings are constantly kept free from the material which is being separated from the water, and which ordinarily collects in the screen openings.

The invention further consists in a screen composed of spaced ring-like screen units secured together and provided with a hub within the hollow of the screen and connected with one end thereof.

The invention further consists in a screen composed of ring-like units secured together and having means on the exterior of the rings for breaking up solid material which is carried to the screen by gradually reducing the larger solids by a cutting operation, until the cut-off particles and the solids from which they are cut when reduced sufficiently may pass through the screen along with the flowing stream of liquid sewage, without such solids either before or after reduction being removed from the stream of liquid by which they were carried to and from the screen.

The invention further consists in the several novel features of construction, arrangement and combination of parts hereinafter fully set forth and claimed.

The invention is clearly illustrated in the drawings accompanying this specification, in which.

Figure 1:
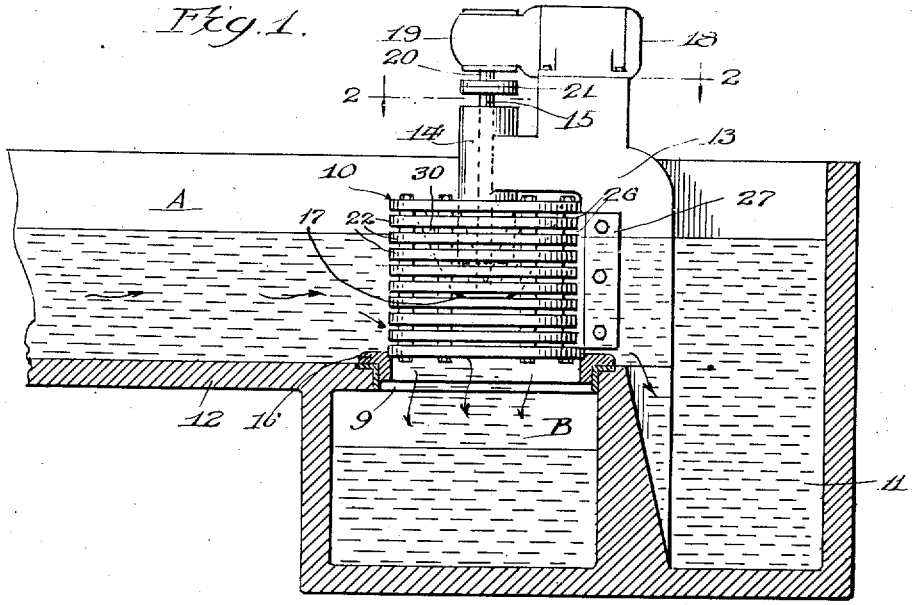
Figure 1 is a view, partly in side elevation and partly in vertical section, of a screen embodying a simple form of the present invention and showing the same applied to the conduits which convey the water to and from the screen, the line of section being indicated at 1—1 in Figure 2.

Referring to said drawings, and first to Figures 1 to 5, inclusive, the reference character A designates an influent channel through which the unscreened water is conveyed to the screen, and B designates the effluent channel through which the screened water is conveyed away therefrom. These channels may be in the form of concrete structures, if desired, and may be of any desirable form for conveying water or other liquids.

The effluent channel leads from and is located below the influent channel and is connected thereto through an opening 9 which is protected by the screen proper, shown generally at 10. At the end of the influent channel A is a pocket 11, wherein the debris, trash and other solid matter carried along by the influent water are deposited and from which they are removed by suitable mechanism (not shown).

Supported upon the bottom wall 12 of the influent channel is a standard 13 of strong and substantial construction which is formed with a bearing bracket 14 overhanging the opening 9 and adapted to contain bearings for the screen shaft 15. Extending over and fitted into the opening 9 is an annular base 16 which is formed as a part of the standard 13. The screen extends upward from said annular base and rotates therein.

The bearing bracket 14 projects down into the hollow of the screen and the latter is provided with a hub 17 secured to the screen shaft 15 directly below the lower end of the bearing bracket 14. The screen is driven from any suitable source of power, and it is here shown driven from an electric motor 18 mounted upon the top of the standard 13 and provided with speed reducing gearing 19, the low speed shaft 20 of which is connected to the screen shaft 15 by a shaft coupling 21.

The screen 10 is desirably composed of a plurality of ring-like screen units 22 spaced apart by interposed washers 23 and secured together by rods or long bolts 24 having nuts 25 upon their ends engaging with the outermost screen units. The washers 23 are located inwardly some distance from the peripheral edges of the screen units so as to leave free annular spaces outwardly of the washers into which extend the teeth 26 of a comb 27 which is bolted or otherwise secured to the standard 13.

Figure 5:
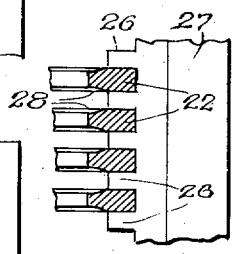
Figure 5 is a detail fragmental vertical section taken on the line 5—5 of Figure 4.
Figure 4:
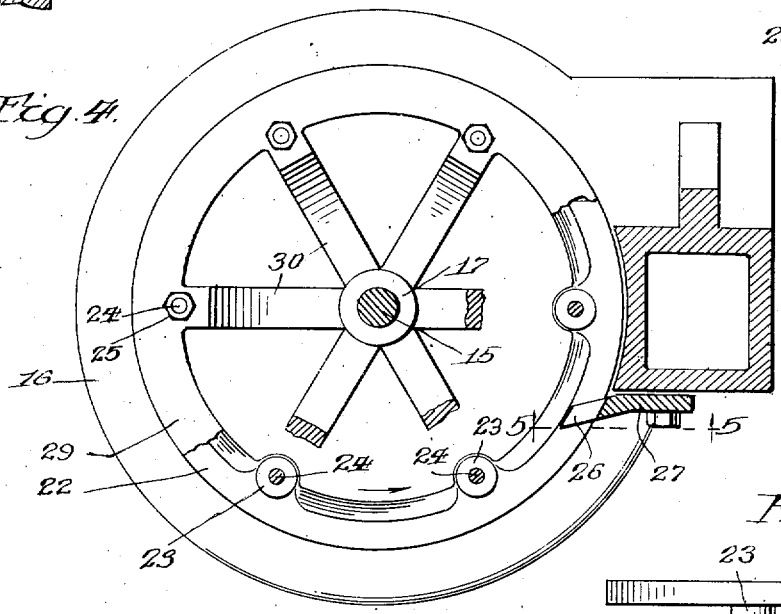
Figure 4 is a view, partly in plan and partly in horizontal section, taken on the line 4—4 of Figure 3.

The sides of the screen units are desirably parallel with each other for some distance inward from the outer peripheries of the screen units beyond which they are relieved, as is illustrated at 28 in Figure 5, and the teeth 26 of the comb are fitted to said free spaces and serve to clear said spaces from any material that might otherwise tend to lodge or collect therein and clog the screen. Desirably the teeth of the comb are disposed in a tangential direction with respect to the screen to facilitate the removal of any matter that encounters the teeth.

The screen units, with the exception of the uppermost one, are similar in construction and are machined accurately to size and shape. The uppermost screen unit 29 is formed with a spider 30 which extends down into the hollow of the screen toward the middle thereof where the arms of the spider are united to the hub 17.

Figure 2:
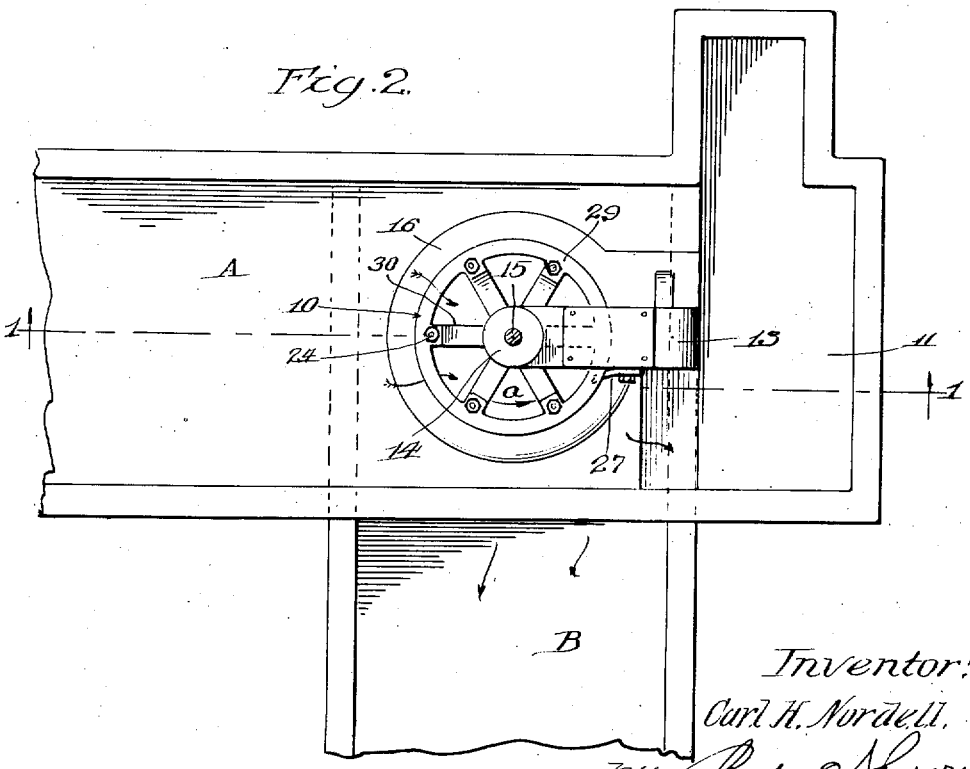
Figure 2 is a view, partly in plan and partly in horizontal section, the line of section being indicated at 2—2 in Figure 1.
Figure 3:
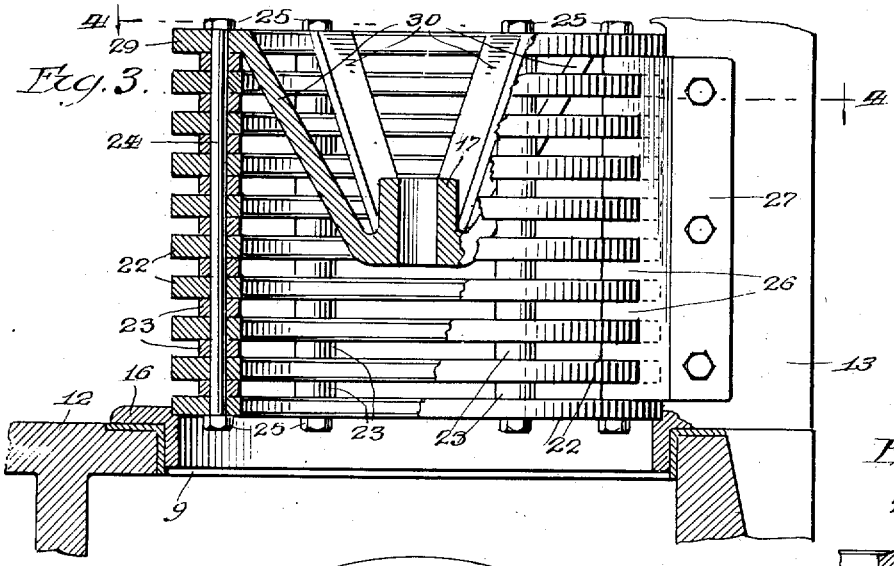
Figure 3 is a detail fragmental view of the screen, partly in side elevation and partly in vertical section.

In operation, the screen is rotated in the direction of the arrow *a* in Figure 2, and the water passes through the spaces between the screen units into the hollow of the screen and discharges through the opening 9 into the effluent channel B. The water is not permitted to enter the screen through its open top. Any solid matter which is too large to pass through the spaces between the screen units discharges into the pocket 11 from which it is removed by any suitable means. Any matter which tends to collect in the spaces between the screen units encounters the teeth of the comb and is removed from the screen. Desirably the screen is rotated at a relatively high speed, as, for instance, sixty revolutions per minute, and from this it will be observed that the openings in the screen are effectively and continuously kept clear, thereby preventing any foreign matter from clogging the screen.

The screen is very easily assembled and may be constructed of any desirable length. Moreover, by selecting washers of the proper thickness the sizes of the openings may be regulated to suit any particular requirement.

With the use of the continuous free spaces between the screen units, a rigid toothed comb may be used to keep the spaces clear of foreign matter, which is not possible where the screen openings are in the form of slots or other restricted openings. Moreover, since the screen may be rotated at a comparatively high speed, the entire screen opening may be cleared once every second or thereabout, thus effectively preventing any clogging of the screen.

Figure 7:
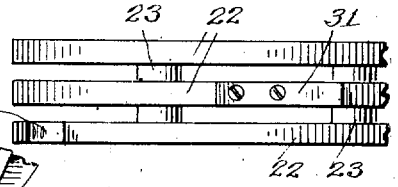
Figure 7 is a fragmental side elevation of the screen seen in Figure 6.
Figure 6:
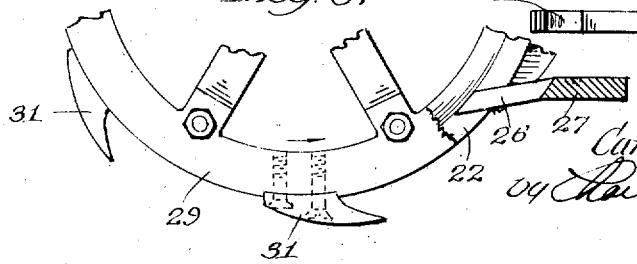
Figure 6 is a fragmental plan of the screen illustrating an additional feature.

In the form of the invention illustrated in Figures 6 and 7, sharp cutting teeth 31 are screwed or otherwise fastened to the outer faces of the screen units 22 and serve to break up debris, trash or other solid matter which is too large to pass through the spaces between the screen units, and, at the same time, the teeth 26 of the comb 27 serve to clear said spaces, as in the preferred form. In this case, the spaces between the teeth of the comb 27 are made sufficiently deep to permit the cutting teeth 31 to pass therethrough.

It will be understood that any material caught between the cutting teeth 31 and the comb 27 will be broken up, and that when reduced sufficiently, such material may pass through the spaces between the screen units. This form of the invention is used where it is not essential that the foreign matter be separated from the water so long as it is broken up into small fragments capable of passing through the spaces between the screen units.

The screen may be machined to size and the openings between the screen units machined to exact size after the screen units have been assembled. As a result, a close fit may be had between the teeth of the comb and the sides of the screen unit without any danger of binding.

I claim:

1. A screen comprising a rotatory drum-like screen composed of spaced apart ring-like screen units rigidly secured together and having cutting teeth upon their outer peripheries, and a stationary mounted comb having teeth entering the spaces between the screen units.

2. A screen comprising a rotatable straining wall adapted to be interposed in a flowing stream containing large and small solids, said wall providing openings large enough to permit liquid and material of small size to pass therethrough but small enough to prevent the passage therethrough of the larger sized sewage solids, walls forming a conduit in which the straining wall is interposed and through which the stream flows, the walls of said conduit in advance of the straining wall serving to detain the larger material in the stream and to direct it against the straining wall, submerged cutting members in the form of teeth carried by said rotatable straining wall, a stationary cutting bar adjacent the rotatable straining wall with which said teeth cooperate to cut the larger solids into smaller solids of a size to pass through the openings provided by the straining wall along with the flow of liquid through said conduit.

3. A screen comprising a straining wall adapted to be interposed in a flowing stream containing solids, said straining wall having rotatable spaced tooth-carrying members, a drive shaft upon which said tooth-carrying members are mounted, cutting teeth secured on the peripheries of said tooth-carrying members, walls forming a conduit in which the straining wall, is interposed and directing liquid and solids to and from said straining wall a stationarily mounted notched bar within the conduit extending parallel with and adjacent to the straining wall with the notches disposed in the paths of travel of the cutting teeth and the cutting teeth cooperating with said notched bar to cut out small pieces from solids caught between the cutting teeth and the notched bar.

4. A screen comprising a straining wall adapted to be interposed in a flowing stream containing solids, said straining wall having rotatable spaced tooth-carrying members, a drive shaft upon which said tooth-carrying members are mounted, cutting teeth secured on the peripheries of submerged tooth-carrying members, the teeth on adjacent tooth-carrying members being out of axial alignment with one another, walls forming a conduit in which said straining wall is interposed and directing liquid and solids to and from said straining wall, a stationarily mounted notched bar within the conduit extending substantially parallel with the axis of the rotating members of the straining wall and adjacent the periphery thereof with its notches disposed in the paths of travel of the cutting teeth, the cutting teeth and rotating straining wall serving to move the solids to one side of the line of flow of sewage, thereby to free the straining wall of solids, and the cutting teeth cooperating with the notched bar to cut out small pieces from solids caught between the cutting teeth and the bar.

5. In combination, a straining wall adapted to be interposed in a flowing stream containing solids, said straining wall having rotatable spaced circular straining members, a drive shaft upon which said straining members are mounted, teeth secured on the peripheries of the straining members, the teeth of the several straining members being axially misaligned with respect to those on adjacent straining members, walls forming a conduit in which said straining wall is interposed and directing liquid and solids to and from said straining wall, a stationarily mounted notched bar within the conduit extending parallel with the axis of said straining wall and adjacent the upstream surface thereof with the notches disposed in the paths of travel of the teeth and the teeth successively cooperating with the notched bar to cut out small pieces from the solids caught between the teeth and the bar.

6. A straining wall adapted to be interposed in a flowing stream containing large solids, said wall comprising rotatable spaced screen units having substantially cylindrical peripheries, cutting teeth secured on the peripheries of said screen units, walls forming a sewage-carrying conduit in which the straining wall is interposed and directing liquid and all solids to said straining wall and directing liquid and small solids from said straining wall, a stationary bar extending within said conduit substantially parallel with the axis of said rotatable screen units and adjacent the peripheries of said screen units, said bar having teeth with spaces therebetween, the spaces being disposed in the paths of travel of the cutting teeth, the teeth on the bar and the portion of the bar between the teeth on he bar cooperating with the teeth on the peripheries of the screen units to cut pieces from the large solids until the large solids are so reduced in size that they may pass through the spaces of the straining wall.

7. A screen comprising in combination a rotating slotted cylindrical straining wall adapted to be interposed in a flow of sewage for intercepting solids of a larger size than will pass through the slots in said wall, and comminuting means, part of which is mounted on the exterior of the cylinder straining wall and the other part of which is stationarily mounted, cooperating to reduce the intercepted solids to small enough size to pass through the slots along with the flow of liquid.

8. The method of straining sewage which consists in delaying solids in a flowing stream, moving the solids laterally beneath the surface of the flowing stream, cutting bits from the delayed solids in their lateral positions below the surface of and in the stream, releasing the bits to pass with the stream from the delayed position, and releasing from the delayed position the last portions of the solids to the flowing stream when they have been reduced to the size of the bits.

9. The method of reducing the size of solids carried by a stream flowing through the openings in a submerged screen which consists in intercepting said solids on the screen, relatively moving said screen and solids to clean a portion of said screen to permit the free passage of the liquid and small solids of said stream through said screen, and cutting from said solids small portions thereof of a size to pass through the openings of the screen until said solids are reduced to a size that can pass through the openings of the screen.

10. The method of clearing a stream of sewage of solids larger than a predetermined size which consists of intercepting all of said over-size solids by a straining medium, clearing the straining medium for the passage of sewage and small solids by transferring the intercepted over-size solids beneath the surface of the sewage to a zone of comminution, and comminuting the transferred solids in the stream below the surface of the sewage in said comminuting zone into fragments smaller than the aforesaid over-size solids.

11. The method of straining sewage which consists in straining out all of the solids larger than a predetermined size from all of the liquid in a flowing stream, moving said over-size solids to a communicating zone, relatively moving the straining medium and the over-sized solids thus clearing the straining medium for the passage of liquids and small solids, and comminuting the intercepted and moved solids below the surface of the stream of liquid by gradually reducing the size of the intercepted solids below the surface of the sewage, whereby the intercepted solids when comminuted may pass through the straining medium along with the flow of liquid.

12. The method of treating sewage which consists in interposing a screen in a flowing stream whereby all of the liquid must flow once only through the screen, intercepting solids upon the surface of the upstream side of the screen, cutting from said solids small portions until such solids are completely comminuted and pass through the openings in the screen along with the flow of liquid.

13. The method of treating sewage which consists in intercepting a flowing stream with a screen through which all of the liquid in the stream must flow, stopping all of the solids too large to flow through said screen on the surface of the upstream side of the screen, and cutting from said solids small pieces of a size to pass through said screen with the liquid in the stream until all of the solids have passed through the screen with the stream.

14. A screen comprising a cylindrical straining wall adapted to be interposed in a flowing stream containing solids, said wall having circumferential slots therein permitting liquid and material of small enough size to pass through, a comb having teeth entering said slots, the wall and comb being relatively rotatable whereby the teeth of the comb rid said slots of accumulated matter, and comminuting means mounted on the outer face of the wall cooperating with the comb to reduce the strained-out material to small enough size to pass through the slots in the wall.

CARL H. NORDELL.